(12) United States Patent
Byrne et al.

(10) Patent No.: US 10,926,586 B2
(45) Date of Patent: Feb. 23, 2021

(54) TIRE TREAD HAVING A FLEXIBLE GATE APPARATUS

(71) Applicant: Bridgestone Americas Tire Operations, LLC, Nashville, TN (US)

(72) Inventors: Francis J. Byrne, Franklin, TN (US); Martin A. Yurjevich, North Canton, OH (US)

(73) Assignee: Bridgestone Americas Tire Operations, LLC, Nashville, TN (US)

( * ) Notice: Subject to any disclaimer, the term of this patent is extended or adjusted under 35 U.S.C. 154(b) by 207 days.

(21) Appl. No.: 15/107,699

(22) PCT Filed: Dec. 26, 2014

(86) PCT No.: PCT/US2014/072409
§ 371 (c)(1),
(2) Date: Jun. 23, 2016

(87) PCT Pub. No.: WO2015/100435
PCT Pub. Date: Jul. 2, 2015

(65) Prior Publication Data
US 2016/0318353 A1     Nov. 3, 2016

Related U.S. Application Data

(60) Provisional application No. 61/920,774, filed on Dec. 26, 2013.

(51) Int. Cl.
*B60C 19/00* (2006.01)
*B60C 11/11* (2006.01)
(Continued)

(52) U.S. Cl.
CPC ........ *B60C 19/002* (2013.01); *B60C 11/0304* (2013.01); *B60C 11/11* (2013.01);
(Continued)

(58) Field of Classification Search
CPC . B60C 11/0304; B60C 11/11; B60C 11/1307; B60C 11/1353; B60C 19/002;
(Continued)

(56) References Cited

U.S. PATENT DOCUMENTS

| 1,147,149 A | 7/1915 | Wilmer |
| 1,254,050 A | 1/1918 | Macbeth |

(Continued)

FOREIGN PATENT DOCUMENTS

| DE | 4403662 A1 | 8/1995 |
| EP | 1533142 A1 | 5/2005 |

(Continued)

OTHER PUBLICATIONS

WO2012049772A1—Machine Translation (Year: 2012).*

(Continued)

*Primary Examiner* — Matthew J Daniels
*Assistant Examiner* — Yunju Kim
(74) *Attorney, Agent, or Firm* — Shaun J. Fox; Thomas Y. Kendrick (57) ABSTRACT

Various embodiments of a tire tread having one or more flexible gate apparatuses are disclosed. In one embodiment, a tire having a tread is provided, the tire comprising: a groove comprising a groove base and at least one groove sidewall; at least one flexible gate apparatus comprising a plurality of adjacent flexible gate elements oriented in a single row across at least a portion of the groove; wherein the plurality of flexible gate elements extend from the groove base; wherein the at least one flexible gate apparatus comprises a rigidity such that the at least one flexible gate apparatus does not substantially deflect at the application of an air pressure during operation; and wherein the at least one flexible gate apparatus comprises a rigidity such that the at (Continued)

least one flexible gate apparatus deflects at the application of a water pressure during operation.

13 Claims, 6 Drawing Sheets

(51) Int. Cl.
  *B60C 11/13* (2006.01)
  *B60C 11/03* (2006.01)
(52) U.S. Cl.
  CPC ...... *B60C 11/1307* (2013.01); *B60C 11/1353* (2013.01); *B60C 2011/1338* (2013.01); *B60C 2011/1361* (2013.01)
(58) Field of Classification Search
  CPC ..... B60C 2011/1338; B60C 2011/1361; B60C 11/117; B60C 11/13; B60C 11/24
  USPC ............. 152/209.18, 209.19, 209.21, 209.22
  See application file for complete search history.

(56) References Cited

U.S. PATENT DOCUMENTS

| | | | |
|---|---|---|---|
| 2,056,131 A | 9/1936 | Brittain | |
| 2,121,871 A | 6/1938 | Havens | |
| D115,424 S | 6/1939 | Prail | |
| 2,261,025 A | 10/1941 | Havens | |
| 2,272,879 A | 2/1942 | Hargraves | |
| 2,290,625 A | 7/1942 | Stein | |
| 2,322,505 A | 6/1943 | Bull | |
| 2,404,579 A | 7/1946 | Coben | |
| 2,621,698 A | 12/1952 | Zohrer | |
| 2,637,362 A | 5/1953 | Briscoe et al. | |
| 2,661,041 A | 12/1953 | Walsh | |
| 2,701,598 A | 2/1955 | Gray | |
| 2,706,509 A | 4/1955 | White | |
| 2,819,751 A | 1/1958 | Frary et al. | |
| 2,843,172 A | 7/1958 | Berry et al. | |
| 2,850,066 A | 9/1958 | Nellen | |
| 3,055,410 A | 9/1962 | Caulkins | |
| 3,462,328 A | 8/1969 | Buckland | |
| 3,706,334 A | 12/1972 | Hoke | |
| 3,727,661 A | 4/1973 | Hoke | |
| 3,763,911 A | 10/1973 | Montagne | |
| 3,858,633 A | 1/1975 | Boileau | |
| 3,893,498 A | 7/1975 | Wayne | |
| 3,897,813 A | 8/1975 | Verdier | |
| 3,938,572 A | 2/1976 | Nishi et al. | |
| 4,217,942 A | 8/1980 | Takigawa et al. | |
| 4,222,424 A | 9/1980 | Tsuzura et al. | |
| 4,230,512 A | 10/1980 | Makino et al. | |
| 4,702,292 A | 10/1987 | Brayer | |
| 4,703,787 A | 11/1987 | Ghilardi | |
| 4,747,435 A | 5/1988 | Trabandt et al. | |
| 5,012,847 A | 5/1991 | Fukumoto et al. | |
| 5,022,448 A | 6/1991 | Ochiai | |
| 5,024,260 A | 6/1991 | Ochiai | |
| 5,147,478 A | 9/1992 | Nock et al. | |
| 5,154,216 A | 10/1992 | Ochiai et al. | |
| D336,069 S | 6/1993 | White | |
| D344,050 S | 2/1994 | Overhoff et al. | |
| 5,361,815 A | 11/1994 | Loser et al. | |
| 5,386,861 A | 2/1995 | Overhoff et al. | |
| 5,445,201 A | 8/1995 | Kukimoto et al. | |
| 5,535,798 A | 7/1996 | Nakamura | |
| 5,542,630 A | 8/1996 | Savill | |
| 5,549,146 A | 8/1996 | Trabandt et al. | |
| 5,658,404 A | 8/1997 | Brown et al. | |
| 5,665,184 A | 9/1997 | Fukumoto | |
| 5,830,294 A | 11/1998 | Shibata et al. | |
| 6,119,744 A | 9/2000 | Tsukagoshi | |
| 6,250,354 B1 | 6/2001 | Kawai | |
| 6,343,634 B1 | 2/2002 | Suzuki | |
| 6,401,774 B1 | 6/2002 | Rooney | |
| 6,415,835 B1 | 7/2002 | Heinen | |
| 6,505,661 B1 | 1/2003 | Nakagawa et al. | |
| 6,601,280 B1 | 8/2003 | Kleckner | |
| 6,631,746 B2 | 10/2003 | Neumann | |
| 6,695,024 B2 | 2/2004 | Neugebauer et al. | |
| 6,796,349 B2 | 9/2004 | Tozawa et al. | |
| 6,866,076 B2 | 3/2005 | Ohsawa | |
| 6,918,420 B2 | 7/2005 | Matsumoto | |
| 6,929,044 B1 | 8/2005 | Rooney | |
| 6,986,372 B2 | 1/2006 | Below | |
| 7,004,216 B2 | 2/2006 | Godefroid | |
| 7,048,022 B2 | 5/2006 | Rooney et al. | |
| 7,182,113 B2 | 2/2007 | Saguchi | |
| 7,273,081 B2 | 9/2007 | Miyake | |
| 7,281,554 B2 | 10/2007 | Takahashi | |
| 7,290,578 B2 | 11/2007 | Nguyen et al. | |
| 7,347,238 B2 | 3/2008 | Miyasaka | |
| 7,380,577 B2 | 6/2008 | Merino Lopez | |
| 7,503,361 B2 | 3/2009 | Metz | |
| 7,516,767 B2 | 4/2009 | Tsubono et al. | |
| 7,537,033 B2 | 5/2009 | Yamane | |
| 7,543,617 B2 | 6/2009 | Matsumoto | |
| 7,581,577 B2 | 9/2009 | Tanno | |
| 7,762,297 B2 | 7/2010 | Takahashi et al. | |
| 7,849,895 B2 | 12/2010 | Fukunaga | |
| 8,297,323 B2 | 10/2012 | Takahashi et al. | |
| 8,408,260 B2 | 4/2013 | Kawagoe | |
| 8,701,724 B2 | 4/2014 | Colombo et al. | |
| 8,776,847 B2 | 7/2014 | De Benedittis | |
| 8,789,567 B2 | 7/2014 | Iwabuchi | |
| 9,168,792 B2 | 10/2015 | Gaus | |
| 9,180,740 B2 | 11/2015 | Dautrey | |
| 9,205,707 B2 | 12/2015 | Shimanaka et al. | |
| 9,409,446 B2 | 8/2016 | Watabe et al. | |
| 9,688,039 B2 | 6/2017 | Pialot, Jr. | |
| 2005/0103416 A1 | 5/2005 | Rooney | |
| 2006/0157179 A1 | 7/2006 | Bito et al. | |
| 2007/0163692 A1 | 7/2007 | Miyasaka et al. | |
| 2010/0006198 A1 | 1/2010 | Watabe | |
| 2010/0212793 A1 | 8/2010 | Kaji | |
| 2012/0037287 A1 | 2/2012 | Atake et al. | |
| 2013/0292020 A1* | 11/2013 | Pialot | B60C 19/002 152/209.19 |
| 2014/0299243 A1* | 10/2014 | Roty | B60C 11/042 152/209.21 |
| 2014/0338805 A1* | 11/2014 | Roty | B60C 11/1353 152/209.18 |

FOREIGN PATENT DOCUMENTS

| | | | |
|---|---|---|---|
| EP | 2628613 A1 | 8/2013 | |
| JO | 2013-35412 A | 2/2013 | |
| JP | 05-155203 A | 6/1993 | |
| JP | 09-58217 A | 3/1997 | |
| JP | 9-2020 | 9/1997 | |
| JP | 2004-181980 A | 7/2004 | |
| JP | 2009023505 A | 2/2009 | |
| KR | 1020100077308 A | 7/2010 | |
| KR | 101001807 B | 12/2010 | |
| KR | 1020120047552 A | 5/2012 | |
| WO | WO-2011132064 A1 * | 10/2011 | ............. B60C 11/13 |
| WO | WO-2012049772 A1 * | 4/2012 | ............. B60C 11/13 |
| WO | 2012072444 A1 | 6/2012 | |
| WO | 2013001652 A1 | 1/2013 | |

OTHER PUBLICATIONS

English machine translation of Abstract of JP2009023505A.
English machine translation of Abstract of DE4403662A1.
Supplementary European Search Report, date of completion Jul. 4, 2017, issued in EP14875830.
Lee, Chang Ho; International Search Report and Written Opinion for PCT/US2014/072409; dated Apr. 27, 2015; pp. 1-13; Korean Intellectual Property Office; Daejeon Metropolitan City; Republic of Korea.
English Abstract of KR1020120047552A.
English Abstract of KR101001807B.

(56) References Cited

OTHER PUBLICATIONS

English Abstract of JP2013-35412A.
English machine translation of Abstract of JPH09-58217A.
English machine translation of Abstract of JPH05-155203A.
English machine translation of Abstract of JP2004-181980A.
English translation of Abstract of KR10-2010-0077308A.
Machine translation of JP 9-2020, 1997.

* cited by examiner

TIRE TREAD HAVING A FLEXIBLE GATE APPARATUS

CROSS-REFERENCE TO RELATED APPLICATIONS

This application claims priority from U.S. Provisional Patent Application No. 61/920,774, filed on Dec. 26, 2013, which is incorporated by reference herein in its entirety.

BACKGROUND

Tires typically include any of a variety of tread patterns optimized for different driving conditions. Often, tread patterns are added to tires to aid in maintaining tractive force in adverse driving conditions, such as operation on wet roadways. For example, some tires comprise circumferential grooves that may or may not communicate with the shoulders of the tire for directing the flow of water through the contact patch of the tread pattern and discharging it away from the tire. However, tires with such tread patterns may generate pattern noise as the result of air flowing through the tread pattern during dry operating conditions. Pattern noise can be uncomfortable for the operator or other occupants of a vehicle fitted with such tires.

What is needed is a tire configured to provide increased wet performance while mitigating pattern noise generated by the tread pattern.

SUMMARY

In one embodiment, a tire having a tread is provided, the tire comprising: a groove comprising a groove base and at least one groove sidewall; at least one flexible gate apparatus comprising a plurality of adjacent flexible gate elements; wherein the plurality of flexible gate elements extend from the groove base; wherein the at least one flexible gate apparatus comprises a rigidity such that the at least one flexible gate apparatus does not substantially deflect at the application of an air pressure during operation; and wherein the at least one flexible gate apparatus comprises a rigidity such that the at least one flexible gate apparatus deflects at the application of a water pressure during operation.

In another embodiment, a tire having a tread is provided, the tire comprising: a groove comprising a groove base and at least one groove sidewall; at least one flexible gate apparatus comprising a plurality of adjacent flexible gate elements oriented in a single row across at least a portion of the groove; wherein the plurality of flexible gate elements extend from the groove base; wherein the at least one flexible gate apparatus comprises a rigidity such that the at least one flexible gate apparatus does not substantially deflect at the application of an air pressure during operation; and wherein the at least one flexible gate apparatus comprises a rigidity such that the at least one flexible gate apparatus deflects at the application of a water pressure during operation.

In another embodiment, a tire having a tread is provided, the tire comprising: a groove comprising a groove base and at least one groove sidewall; at least one flexible gate apparatus; wherein the at least one flexible gate apparatus extends from the at least one groove sidewall; wherein the at least one flexible gate apparatus comprises a rigidity such that the at least one flexible gate apparatus does not substantially deflect at the application of an air pressure during operation; and wherein the at least one flexible gate apparatus comprises a rigidity such that the at least one flexible gate apparatus deflects at the application of a water pressure during operation.

In another embodiment, a tire having a tread is provided, the tire comprising: a groove comprising a groove base and at least one groove sidewall; at least one flexible gate apparatus; wherein the at least one flexible gate apparatus extends from the groove base and the at least one groove sidewall; wherein the at least one flexible gate apparatus comprises a rigidity such that the at least one flexible gate apparatus does not substantially deflect at the application of an air pressure during operation; and wherein the at least one flexible gate apparatus comprises a rigidity such that the at least one flexible gate apparatus deflects at the application of a water pressure during operation.

BRIEF DESCRIPTION OF THE DRAWINGS

The accompanying figures, which are incorporated in and constitute a part of the specification, illustrate various example configurations, and are used merely to illustrate various example embodiments. In the figures, like elements bear like reference numerals.

DETAILED DESCRIPTION

A tire's engagement with a road surface is its means for providing traction to the vehicle upon which it is mounted. A tire configured to only operate on relatively smooth, dry surfaces, such as a race track, typically comprises a "slick" or non-patterned design configured to provide maximum engagement between the tire and the driving surface. However, such tires perform poorly when exposed to wet driving surfaces and are prone to hydroplaning.

Accordingly, tire tread patterns are regularly designed to optimize performance across a range of dry and wet operating conditions. But, a tire including groove features to channel and evacuate water during wet operation may suffer from pattern noise during dry operation. This pattern noise may result from air flowing through the same groove features. Pattern noise may be annoying or even uncomfortable from the perspective of one operating or occupying a vehicle fitted with such tires.

Pattern noise may be increased in the presence of particular design features. For example, tires without continuous circumferential grooves may not produce as much pattern noise as tires with continuous circumferential grooves. Additionally, tires with closed shoulders may not produce as much pattern noise as tires with grooves that open to the shoulders. However, tires with continuous circumferential grooves and open shoulders may act to channel and evacuate water better than tires not having continuous circumferential grooves and open shoulders.

Figure 1A:
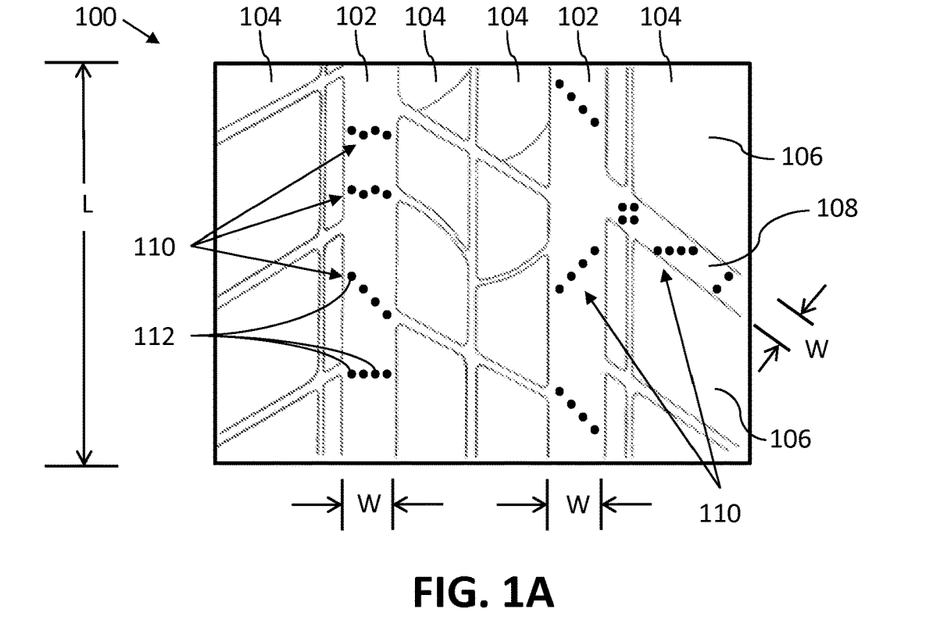
FIG. 1A illustrates a top elevational view of an example embodiment of a tire having a plurality of flexible gate apparatuses in a closed position.

FIG. 1A illustrates an example embodiment of a tire comprising a tread 100 having a plurality of flexible gate apparatuses in a closed position. Tread 100 may comprise at least one groove 102 and at least one rib 104. At least one rib 104 may comprise a plurality of tread blocks 106. In one embodiment, tread 100 may comprise at least one lateral groove 108. Tread 100 may comprise at least one flexible gate apparatus 110. Flexible gate apparatus 110 may comprise a plurality of flexible gate elements 112. At least one groove 102 and at least one lateral groove 108 may comprise a base and at least one sidewall.

Tread 100 may comprise any of a variety of tire treads. For example, tread 100 may be configured for use in one or more of a passenger tire, a truck tire, a bus tire, an off-the-road tire and an agricultural tire. In one embodiment, tread 100 is configured for use in a tire configured for operation on a roadway. In one embodiment, tread 100 is a directional tread. In another embodiment, tread 100 is a non-directional tread.

At least one groove 102 may comprise any of a variety of grooves within tread 100's pattern. In one embodiment, groove 102 comprises a circumferential groove. In another embodiment, groove 102 comprises a continuous circumferential groove. In one embodiment, groove 102 is configured to channel water. In one embodiment, groove 102 comprises a lateral cross-tread groove. In another embodiment, groove 102 is oriented between at least two ribs 104. In another embodiment, groove 102 crosses at least one rib 104. In one embodiment, groove 102 encompasses slots extending laterally or circumferentially in tread 100.

At least one groove 102 may comprise an axial width W. Width W may comprise any of a variety of widths commonly found in tire tread patterns. In one embodiment, width W is about 25 mm or less. Width W may be measured on a plane that is substantially orthogonal to groove 102's longitudinal extent.

At least one rib 104 may comprise any of a variety of ribs within tread 100's pattern. In one embodiment, rib 104 comprises a solid continuous rib. In another embodiment, rib 104 is broken into a plurality of tread blocks 106.

In one embodiment, tread 100 may comprise at least one lateral groove 108. Lateral groove 108 may be configured to communicate with tread 100's shoulder (not shown). In one embodiment, lateral groove 108 is configured to evacuate water from at least one circumferential groove 102. In one embodiment, lateral groove 108 may cross at least one rib 104. In another embodiment, lateral groove 108 may extend between at least two tread blocks 106.

At least one lateral groove 108 may comprise a width W, measured on a plane that is substantially orthogonal to lateral groove 108's longitudinal extent. Width W may comprise any of a variety of widths commonly found in tire tread patterns. In one embodiment, width W is about 25 mm or less.

At least one flexible gate apparatus 110 may extend completely across width W of at least one of groove 102 and lateral groove 108. In another embodiment, at least one flexible gate apparatus 110 extends partially across width W of at least one of groove 102 and lateral groove 108. In one embodiment, at least one flexible gate apparatus 110 extends completely across width W of at least one of groove 102 and lateral groove 108, and partially across width W of at least one of groove 102 and lateral groove 108. In one embodiment, at least one flexible gate apparatus 110 extends completely or partially across width W of lateral groove 108, while no flexible gate apparatus 110 extends across groove 102. In one embodiment, at least one flexible gate apparatus 110 extends completely or partially across width W of groove 102, while no flexible gate apparatus 110 extends across lateral groove 108.

In one embodiment, at least one flexible gate apparatus 110 extends at least 25% across width W of at least one of groove 102 and lateral groove 108. In another embodiment, at least one flexible gate apparatus 110 occupies at least 25% of width W of at least one of groove 102 and lateral groove 108. In another embodiment, at least one flexible gate apparatus 110 occupies less than 25% of width W of at least one of groove 102 and lateral groove 108. In another embodiment, at least one flexible gate apparatus 110 occupies at least 50% of width W of at least one of groove 102 and lateral groove 108. In another embodiment, at least one flexible gate apparatus 110 occupies less than 50% of width W of at least one of groove 102 and lateral groove 108. In another embodiment, at least one flexible gate apparatus 110 occupies at least 75% of width W of at least one of groove 102 and lateral groove 108. In another embodiment, at least one flexible gate apparatus 110 occupies less than 75% of width W of at least one of groove 102 and lateral groove 108. In another embodiment, at least one flexible gate apparatus 110 occupies at least 90% of width W of at least one of groove 102 and lateral groove 108. In another embodiment, at least one flexible gate apparatus 110 occupies less than 90% of width W of at least one of groove 102 and lateral groove 108. In one embodiment, at least one flexible gate apparatus 110 extends at least far enough across width W of at least one of groove 102 and lateral groove 108 to at least partially disrupt the flow of air through tread 100.

Flexible gate apparatus 110 may comprise a plurality of flexible gate elements 112. In one embodiment, a plurality of flexible gate elements 112 are oriented adjacent one another. In one embodiment, flexible gate elements 112 comprise elongated elements extending from a base of at least one of groove 102 and lateral groove 108. Flexible gate elements 112 may extend radially from a base of at least one of groove 102 and lateral groove 108.

In one embodiment, flexible gate elements 112 comprise any of a variety of cross sections, including for example circular, triangular, square, pentagonal, hexagonal, and the like. In one embodiment, flexible gate elements 112 comprise an appearance similar to sprue created by a vent during molding of a tire.

In one embodiment, flexible gate elements 112 are tapered from their base to their radially outermost extent. For example, flexible gate elements 112 may comprise a larger diameter or width nearer their base, and a smaller diameter or width nearer their radially outermost extent.

In one embodiment, each of flexible gate elements 112 comprises a thickness measured in the axial direction of the tire. In one embodiment, each of flexible gate elements 112 comprises a thickness commonly found in a sprue created by a vent during molding of a tire. In another embodiment, each of flexible gate elements 112 comprises a thickness between about 0.5 mm and about 5.0 mm. In another embodiment, each of flexible gate elements 112 comprises a thickness between about 0.8 mm and about 2.0 mm. In another embodiment, each of flexible gate elements 112 comprises a thickness between about 1.0 mm and about 1.5 mm.

Each of flexible gate elements 112 may be oriented across a groove with a defined spacing between each element. Each of flexible gate elements 112 may be evenly spaced across a groove, such that the distance between each flexible gate element 112 and its adjacent flexible gate element 112 in a single flexible gate apparatus 110 is the same. Accordingly, where a groove has a width W, each flexible gate element 112 in a single flexible gate apparatus 110 may be evenly spaced from the next across width W. In one embodiment, flexible gate apparatus 110 extends across only a portion of width W, and each flexible gate element 112 within flexible gate apparatus 110 is evenly spaced from its adjacent flexible gate element 112.

Each of flexible gate elements 112 in a single flexible gate apparatus 110 may be separated from adjacent flexible gate elements 112 by a specified distance (not shown). This distance may be between about 1.0 mm and about 5.0 mm, measured from the center of one flexible gate element to the next. This distance may be about 1.5 mm to about 4.5 mm. This distance may be about 2.0 mm to about 4.0 mm. This distance may be about 2.0 mm to about 3.0 mm. This distance may be about 2.0 mm. This distance may be about 2.5 mm. This distance may be about 3.0 mm. This distance may be about 3.5 mm. This distance may be about 4.0 mm. This distance may be about 4.5 mm. This distance may be about 5.0 mm.

In one embodiment, flexible gate elements 112 comprise a cross-sectional shape configured to provide a stiffness such that flexible gate elements 112 stand against, and at least partially disrupt, an air flow. In another embodiment, flexible gate elements 112 comprise a cross-sectional shape configured to provide a stiffness such that flexible gate elements 112 at least partially deflect against a water flow.

In one embodiment, flexible gate elements 112 are designed to deflect via at least one of a hinging action and a bending action. Flexing of flexible gate elements 112 may occur at any of a variety of positions along the length of flexible gate elements 112, including for example at least one of a radially innermost portion and a radially middle portion of flexible gate elements 112.

In one embodiment, flexible gate elements 112 comprise a stiffness substantially equal to that of a rubber used to make tread 100. In another embodiment, flexible gate elements 112 comprise a stiffness less than that of a rubber used to make tread 100. In another embodiment, flexible gate elements 112 comprise a stiffness greater than that of a rubber used to make tread 100. Flexible gate elements 112 may be formed from the same rubber use to make tread 100. Flexible gate elements 112 may be formed from a different rubber than that used to make tread 100.

In one embodiment, flexible gate apparatus 110 and flexible gate elements 112 are biased in an upright position, extending substantially orthogonally from a base of groove 102 and/or lateral groove 108. In one embodiment, flexible gate elements 112 comprise a resilient material configured to deflect upon application of a water flow, and rebound upon the ceasing of a water flow. Flexible gate elements 112 may comprise any of a variety of materials, including for example a rubber, a polymer, a metal, an alloy, or a composite. In one embodiment, flexible gate elements 112 comprise a tire tread compound. Flexible gate elements 112 may be formed from the same rubber use to make tread 100. Flexible gate elements 112 may be formed from a different rubber than that used to make tread 100.

In one embodiment, flexible gate apparatus 110 and flexible gate elements 112 comprise an integral part of tread 100, and are molded with tread 100. In another embodiment, flexible gate apparatus 110 and flexible gate elements 112 comprise an inserted element placed into tread 100 following molding and curing of tread 100.

Flexible gate elements 112 forming flexible gate apparatus 110 may be oriented adjacent one another in any of a variety of patterns. For example, flexible gate elements 112 may be oriented in a row extending substantially axially, or substantially angled, across at least a portion of groove 102 or lateral groove 108. Flexible gate elements 112 may be oriented in a single row extending across at least a portion of groove 102 or lateral groove 108. Flexible gate elements 112 may be oriented in a single row extending substantially axially, or substantially angled, across at least a portion of groove 102 or lateral groove 108. Flexible gate elements 112 may be oriented in a single, straight row extending substantially axially, or substantially angled, across at least a portion of groove 102 or lateral groove 108. Flexible gate elements 112 may be oriented in a curved or staggered/zigzag pattern extending across at least a portion of groove 102 or lateral groove 108. Flexible gate elements 112 may also be oriented in a cluster pattern extending across at least a portion of groove 102 or lateral groove 108. Flexible gate elements 112 may be oriented in any of a variety of patterns configured to at least partially disrupt a flow of air while deflecting against a flow of water.

In one embodiment, flexible gate apparatus 110 may be oriented in single position of tread 100 about the circumference of a tire. In another embodiment, flexible gate apparatus 110 may be oriented in multiple positions of tread 100 about a circumference of a tire. In one embodiment, at least one of groove 102 and lateral groove 108 comprises at least one flexible gate apparatuses 110. For example, a single continuous circumferential groove may comprise one or more flexible gate apparatuses 110. In another embodiment, flexible gate apparatuses 110 are oriented such that at least one of groove 102 and lateral groove 108 in each tire footprint comprise a flexible gate apparatus 110.

In one embodiment, tread 100 comprises a length L measured in the circumferential direction. Length L may be about equal to the length of any given footprint of tread 100. In one embodiment, at least one flexible gate apparatus 110 is oriented in a length L of tread 100. In another embodiment, a plurality of flexible gate apparatuses 110 are oriented in a length L of tread 100. In another embodiment, at least one flexible gate apparatus 110 is oriented in each of at least one groove 102 in a length L of tread 100. In another embodiment, a plurality of flexible gate apparatuses 110 are oriented in each of at least one groove 102 in a length L of tread 100. In one example embodiment, length L is about 100 mm, and each flexible gate apparatus 110 in each of at least one groove 102 are separated by about 50 mm. Each flexible gate apparatus 110 may be separated by between about 10 mm and about 50 mm. Each flexible gate apparatus 110 may be separated by at least 10 mm. Each flexible gate apparatus 110 may be separated by at least 20 mm. Each flexible gate apparatus 110 may be separated by at least 30 mm. Each flexible gate apparatus 110 may be separated by at least 40 mm.

Each flexible gate apparatus 110 in a groove may be separated by the same distance, such that a series of flexible gate apparatuses 110 are evenly spaced about the circumference of the tire. Flexible gate apparatus 110 may include a series of flexible gate elements 112 oriented in a substantially straight line, and each of flexible gate apparatus 110 may be evenly spaced from one another.

Figure 1B:
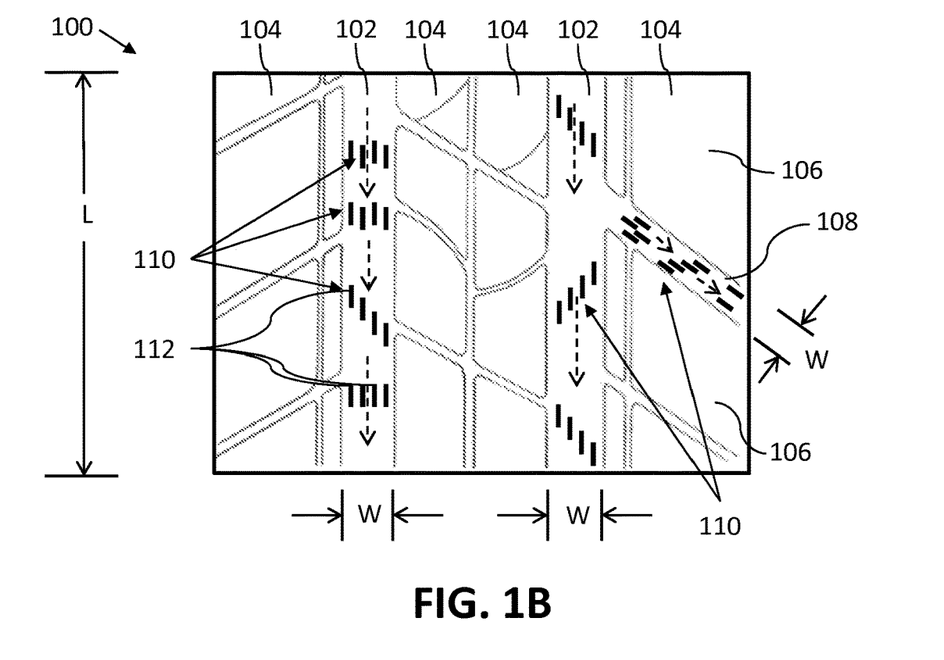
FIG. 1B illustrates a top elevational view of an example embodiment of a tire having a plurality of flexible gate apparatuses in an open position.

FIG. 1B illustrates an example embodiment of a tire comprising a tread 100 having a plurality of flexible gate apparatuses 110 in an open position. As illustrated, flexible gate apparatuses 110 at least partially deflect upon the application of a flow of water through tread 100. Dashed arrows in FIG. 1B illustrate a possible flow of water across tread 100. At least one of flexible gate apparatuses 110 deflect and lay over upon encountering a flow of water. Upon the ceasing of a flow of water, at least one of flexible gate apparatuses 110 rebound to a "closed" position, as illustrated in FIG. 1A, wherein flexible gate apparatuses 110 act to at least partially disrupt a flow of air.

Tread 100 may include at least one groove 102, 108 including a plurality of flexible gate apparatuses 110. Flexible gate apparatuses 110 may comprise a plurality of flexible gate elements 112. Flexible gate apparatuses 110 may be spaced from one another enough such that flexible gate elements 112 of a first flexible gate apparatus 110 may deflect without contacting flexible gate elements 112 in a second flexible gate apparatus 110. Thus, flexible gate apparatuses 110 may be spaced apart by a distance that is at least equal to the radial height H (illustrated in FIG. 2) of flexible gate elements 112.

A spacing of flexible gate apparatuses 110 that is less than the radial height H of flexible gate elements 112 may cause contact between flexible gate elements 112 of a first flexible gate apparatus 110 and flexible gate elements 112 of a second flexible gate apparatus 110. This contact may result in flexible gate elements 112 of the first flexible gate apparatus 110 catching on flexible gate elements 112 of the second flexible gate apparatus 110, and possibly failing to properly rebound to a "closed" position upon ceasing of the flow of water. This may in turn result in flexible gate apparatuses 110 failing to properly function to disrupt a flow of air.

Figure 2:
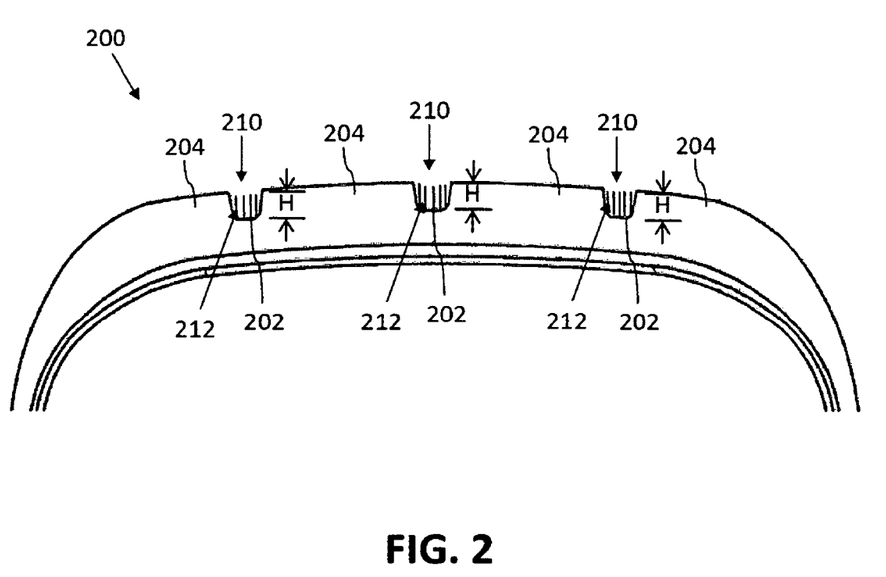
FIG. 2 illustrates a cross-sectional view of an example embodiment of a tire having a plurality of flexible gate apparatuses in a closed position.

FIG. 2 illustrates a cross-sectional view of an example embodiment of a tire comprising a tread 200 having a plurality of flexible gate apparatuses in a closed position. Tread 200 may comprise at least one groove 202 and at least one rib 204. Tread 200 may comprise at least one flexible gate apparatus 210. Flexible gate apparatus 210 may comprise a plurality of flexible gate elements 212.

In one embodiment, at least one groove 202 and at least one lateral groove (not shown) comprise a height H, measured radially. At least one flexible gate apparatus 210 and flexible gate elements 212 may extend at least partially across height H. In one embodiment, flexible gate apparatus 210 extends to a height H.

In one embodiment, height H extends equal to or less than about 100% of the depth of at least one groove 202. In another embodiment, height H extends between about 20% and about 100% of the depth of at least one groove 202. In another embodiment, height H extends between about 30% and about 90% of the depth of at least one groove 202. In another embodiment, height H extends between about 40% and about 80% of the depth of at least one groove 202. In another embodiment, height H extends between about 45% and about 55% of the depth of at least one groove 202. In another embodiment, height H extends about 50% of the depth of at least one groove 202. Height H may extend less than about 60% of the depth of at least one groove 202. Height H may extend less than about 50% of the depth of at least one groove 202. Height H may extend greater than about 90% of the depth of at least one groove 202.

It is contemplated that the same or similar heights H may be applicable in lateral groove 108 illustrated in FIGS. 1A and 1B.

Figure 3A:
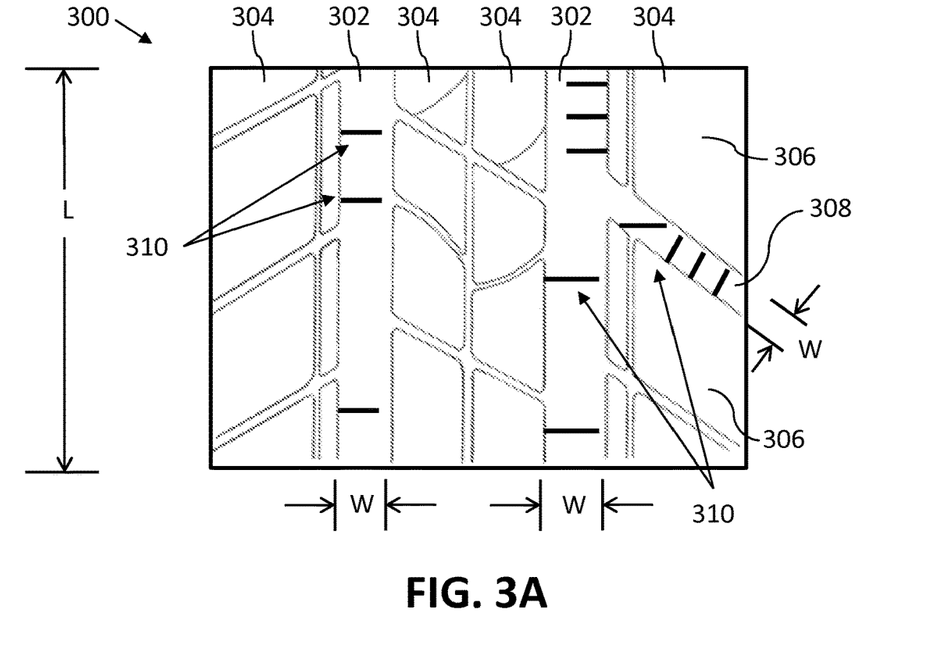
FIG. 3A illustrates a top elevational view of an example embodiment of a tire having a plurality of flexible gate apparatuses in a closed position.

FIG. 3A illustrates an example embodiment of a tire comprising a tread 300 having a plurality of flexible gate apparatuses in a closed position. Tread 300 may comprise at least one groove 302 and at least one rib 304. At least one rib 304 may comprise a plurality of tread blocks 306. In one embodiment, tread 300 may comprise at least one lateral groove 308. Tread 300 may comprise at least one flexible gate apparatus 310.

Tread 300, groove 302, rib 304, tread block 306, and lateral groove 308 may comprise substantially similar properties as described above with respect to tread 100, groove 102, rib 104, tread block 106, and lateral groove 108.

In one embodiment, at least one groove 302 and at least one lateral groove 308 may comprise a width W. At least one groove 302 and at least one lateral groove 308 may comprise a base and at least one sidewall.

At least one flexible gate apparatus 310 may extend completely across width W of at least one of groove 302 and lateral groove 308. In another embodiment, at least one flexible gate apparatus 310 extends partially across width W of at least one of groove 302 and lateral groove 108. In one embodiment, at least one flexible gate apparatus 310 extends completely across width W of at least one of groove 302 and lateral groove 308, and partially across width W of at least one of groove 302 and lateral groove 308. In one embodiment, at least one flexible gate apparatus 310 extends completely or partially across width W of lateral groove 308, while no flexible gate apparatus 310 extends across groove 302.

In one embodiment, at least one flexible gate apparatus 310 extends at least 25% across width W of at least one of groove 302 and lateral groove 308. In another embodiment, at least one flexible gate apparatus 310 occupies at least 50% of width W of at least one of groove 302 and lateral groove 308. In another embodiment, at least one flexible gate apparatus 310 occupies at least 75% of width W of at least one of groove 302 and lateral groove 308. In another embodiment, at least one flexible gate apparatus 310 occupies at least 90% of width W of at least one of groove 302 and lateral groove 308. In one embodiment, at least one flexible gate apparatus 310 extends at least far enough across width W of at least one of groove 302 and lateral groove 308 to at least partially disrupt the flow of air through tread 300.

In one embodiment, at least one flexible gate apparatus 310 comprises a substantially solid element extending from at least one sidewall of at least one of groove 302 and lateral groove 308. In another embodiment, flexible gate apparatus 310 comprises a substantially sheet-like element extending substantially axially at least partially across at least one of groove 302 and lateral groove 308. In another embodiment, flexible gate apparatus 310 extends at an angle at least partially across at least one of groove 302 and lateral groove 308.

In one embodiment, flexible gate apparatus 310 may comprise a plurality of flexible gate elements (not shown) oriented radially outwardly from a base of at least one of groove 302 and lateral groove 308, wherein each of the flexible gate elements extends from a sidewall of at least one of groove 302 and lateral groove 308.

In one embodiment, flexible gate apparatus 310 comprises any of a variety of cross sections. In one embodiment, flexible gate apparatus 310 is tapered from its base in a sidewall of at least one of groove 302 and lateral groove 308, to its axially outermost extent. For example, flexible gate apparatus 310 may comprise a greater thickness (measured substantially perpendicular to flexible gate apparatus 310's longitudinal direction) nearer its base, and a lesser thickness near its axially outermost extent.

In one embodiment, flexible gate apparatus 310 comprises a thickness. In one embodiment, flexible gate apparatus 310 comprises a thickness commonly found in a sprue or flash created by a vent during molding of a tire. In another embodiment, flexible gate apparatus 310 comprises a thickness between about 0.5 mm and about 5.0 mm. In another embodiment, flexible gate apparatus 310 comprises a thickness between about 0.8 mm and about 2.0 mm. In another embodiment, flexible gate apparatus 310 comprises a thickness between about 1.0 mm and about 1.5 mm.

In one embodiment, flexible gate apparatus 310 comprise a cross-sectional shape and a thickness configured to provide a stiffness such that flexible gate apparatus 310 stand against, and at least partially disrupt, an air flow. In one embodiment, flexible gate apparatus 310 comprises a cross-sectional shape and a thickness configured to provide a stiffness such that flexible gate apparatus 310 at least partially deflects against a water flow.

In one embodiment, flexible gate apparatus 310 is designed to deflect via at least one of a hinging action and a bending action. Flexing of flexible gate apparatus 310 may occur at any of a variety of positions along the length of flexible gate apparatus 310, including for example at least one of a base portion and an axially middle portion of flexible gate apparatus 310.

In one embodiment, flexible gate apparatus 310 comprises a stiffness substantially equal to that of a rubber used to make tread 300. In another embodiment, flexible gate apparatus 310 comprises a stiffness less than that of a rubber used to make tread 300. In another embodiment, flexible gate apparatus 310 comprises a stiffness greater than that of a rubber used to make tread 300.

In one embodiment, flexible gate apparatus 310 is biased in a closed position, extending from a sidewall of groove 302 and/or lateral groove 308. In one embodiment, flexible gate apparatus 310 comprises a resilient material configured to deflect upon application of a water flow, and rebound upon the ceasing of a water flow. Flexible gate apparatus 310 may comprise any of a variety of materials, including for example a rubber, a polymer, a metal, an alloy, or a composite. In one embodiment, flexible gate apparatus 310 comprises a tire tread compound.

In one embodiment, flexible gate apparatus 310 comprises an integral part of tread 300, and is molded with tread 300. In another embodiment, flexible gate apparatus 310 comprises an inserted element placed into tread 300 following molding and curing of tread 300.

In one embodiment, flexible gate apparatus 310 may be oriented in single position of tread 300 about the circumference of a tire. In another embodiment, flexible gate apparatus 310 may be oriented in multiple positions of tread 300 about a circumference of a tire. In one embodiment, at least one of groove 302 and lateral groove 308 comprises at least one flexible gate apparatus 310. For example, a single continuous circumferential groove may comprise one or more flexible gate apparatus 310. In another embodiment, at least one flexible gate apparatus 310 is oriented such that at least one of groove 302 and lateral groove 308 in each tire footprint comprise a flexible gate apparatus 310.

In one embodiment, tread 300 comprises a length L measured in the circumferential direction. Length L may be about equal to the length of any given footprint of tread 300. In one embodiment, at least one flexible gate apparatus 310 is oriented in a length L of tread 300. In another embodiment, a plurality of flexible gate apparatuses 310 are oriented in a length L of tread 300. In another embodiment, at least one flexible gate apparatus 310 is oriented in each of at least one groove 302 in a length L of tread 300. In another embodiment, a plurality of flexible gate apparatuses 310 are oriented in each of at least one groove 302 in a length L of tread 300. In one example embodiment, length L is about 100 mm, and each flexible gate apparatus 310 in each of at least one groove 302 are separated by about 50 mm.

Figure 3B:
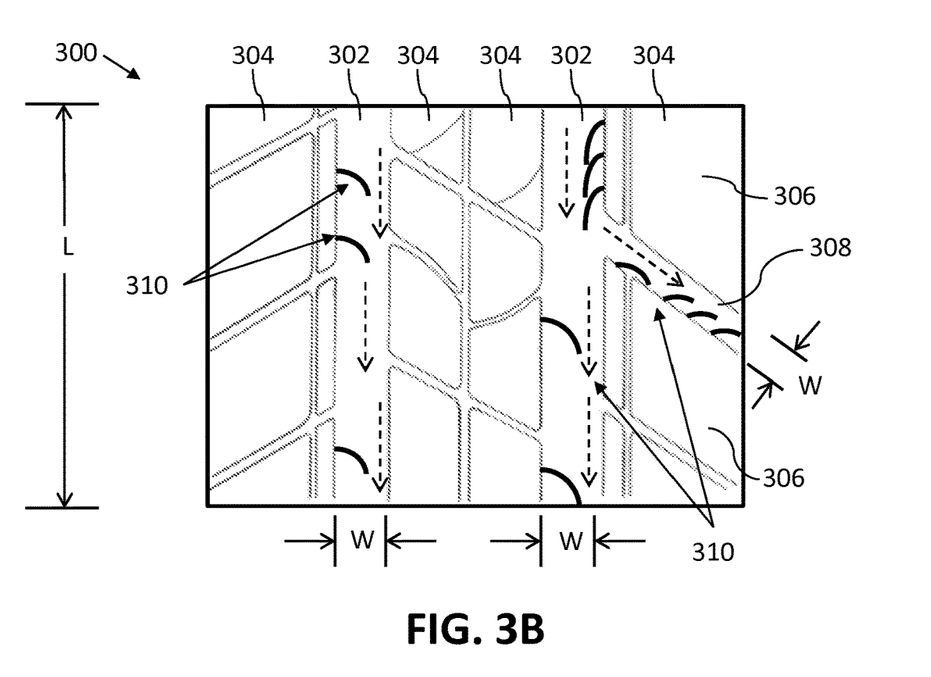
FIG. 3B illustrates a top elevational view of an example embodiment of a tire having a plurality of flexible gate apparatuses in an open position.

FIG. 3B illustrates an example embodiment of a tire comprising a tread 300 having a plurality of flexible gate apparatuses 310 in an open position. As illustrated, flexible gate apparatuses 310 at least partially deflect upon the application of a flow of water through tread 300. Dashed arrows in FIG. 3B illustrate a possible flow of water across tread 300. At least one of flexible gate apparatuses 310 deflect and fold away upon encountering a flow of water. Upon the ceasing of a flow of water, at least one of flexible gate apparatuses 310 rebound to a "closed" position, as illustrated in FIG. 3A, wherein flexible gate apparatuses 310 act to at least partially disrupt a flow of air.

Figure 4:
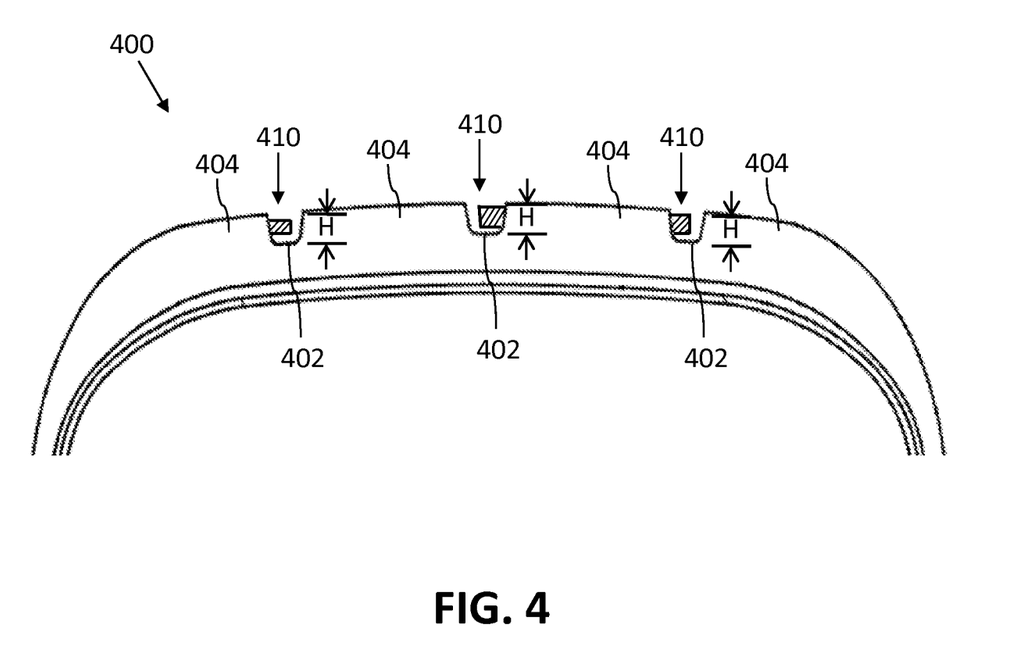
FIG. 4 illustrates a cross-sectional view of an example embodiment of a tire having a plurality of flexible gate apparatuses in a closed position.

FIG. 4 illustrates a cross-sectional view of an example embodiment of a tire comprising a tread 400 having a plurality of flexible gate apparatuses in a closed position. Tread 400 may comprise at least one groove 402 and at least one rib 404. Tread 400 may comprise at least one flexible gate apparatus 410.

In one embodiment, at least one groove 402 and at least one lateral groove (not shown) comprise a height H, measured radially. At least one flexible gate apparatus 410 may extend at least partially across height H. In one embodiment, flexible gate apparatus 410 extends to a height H.

In one embodiment, height H extends equal to or less than about 100% of the depth of at least one groove 402. In another embodiment, height H extends between about 50% and about 100% of the depth of at least one groove 402. In another embodiment, height H extends between about 80% and about 100% of the depth of at least one groove 402.

Figure 5A:
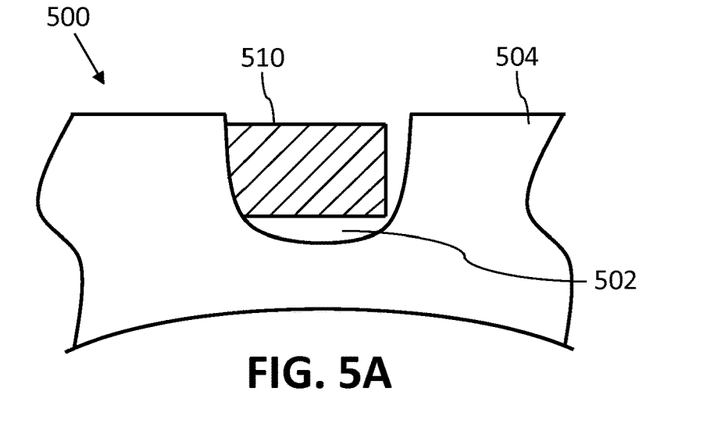
FIG. 5A illustrates a partial cross-sectional view of an example embodiment of a tire having a flexible gate apparatus in a closed position.

FIG. 5A illustrates a partial cross-sectional view of a tire comprising a tread 500. Tread 500 comprises at least one groove 502, at least one rib 504, and at least one flexible gate apparatus 510. Flexible gate apparatus 510 may comprise a substantially rectangular cross-section.

Figure 5B:
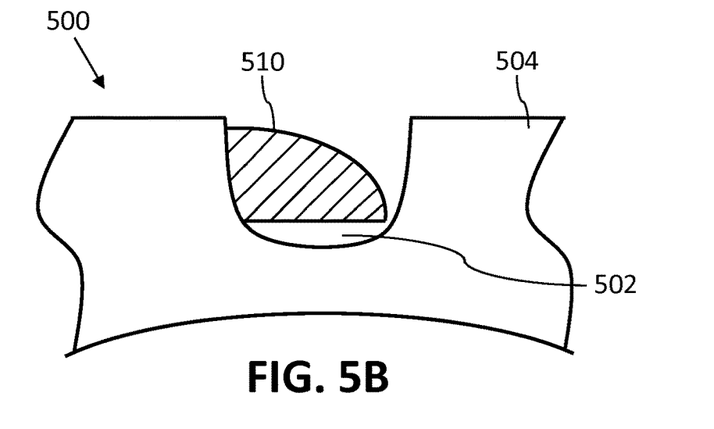
FIG. 5B illustrates a partial cross-sectional view of an example embodiment of a tire having a flexible gate apparatus in a closed position.

FIG. 5B illustrates a partial cross-sectional view of a tire comprising a tread 500. Flexible gate apparatus 510 may comprise a substantially curved radially outer edge and a substantially linear radially inner edge. The radially outer edge of flexible gate apparatus 510 may curve radially inwardly as it extends axially from a sidewall of at least one groove 502.

Figure 5C:
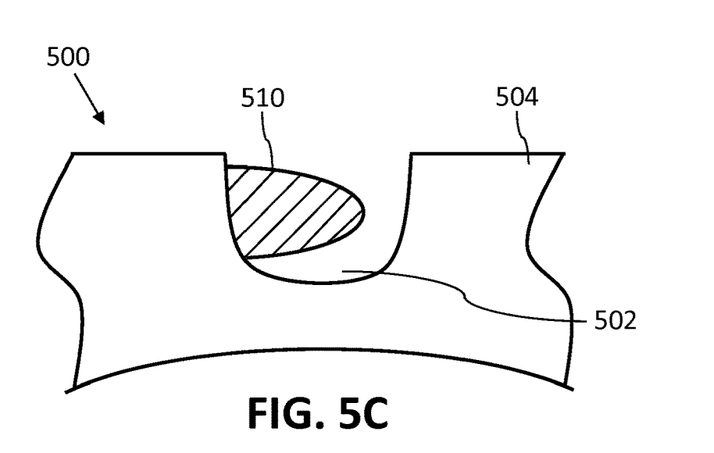
FIG. 5C illustrates a partial cross-sectional view of an example embodiment of a tire having a flexible gate apparatus in a closed position.

FIG. 5C illustrates a partial cross-sectional view of a tire comprising a tread 500. Flexible gate apparatus 510 may comprise a substantially curved radially outer edge and a substantially curved radially inner edge. The radially outer edge of flexible gate apparatus 510 may curve radially inwardly as it extends axially from a sidewall of at least one groove 502. The radially inner edge of flexible gate apparatus 510 may curve radially outwardly as it extends axially from a sidewall of at least one groove 502.

Figure 6A:
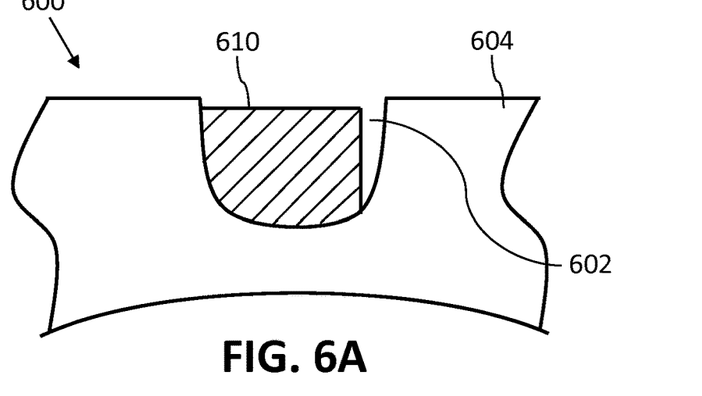
FIG. 6A illustrates a partial cross-sectional view of an example embodiment of a tire having a flexible gate apparatus in a closed position.

FIG. 6A illustrates a partial cross-sectional view of a tire comprising a tread 600. Tread 600 comprises at least one groove 602, at least one rib 604, and at least one flexible gate apparatus 610. Flexible gate apparatus 610 may comprise a substantially rectangular cross-section.

As illustrated, in one embodiment, groove 602 comprises two sidewalls and a base and at least one flexible gate apparatus 610 extends from both a groove sidewall and a groove base. In one embodiment, at least one flexible gate apparatus 610 extends from a groove sidewall and groove base, at least partially across the width of the groove base. In another embodiment, at least one flexible gate apparatus 610 extends from a groove sidewall and groove base, completely across the width of the groove base. In another embodiment, at least one flexible gate apparatus 610 extends from a first groove sidewall, a second groove sidewall, and a groove base, completely across the width of groove 602.

Figure 6B:
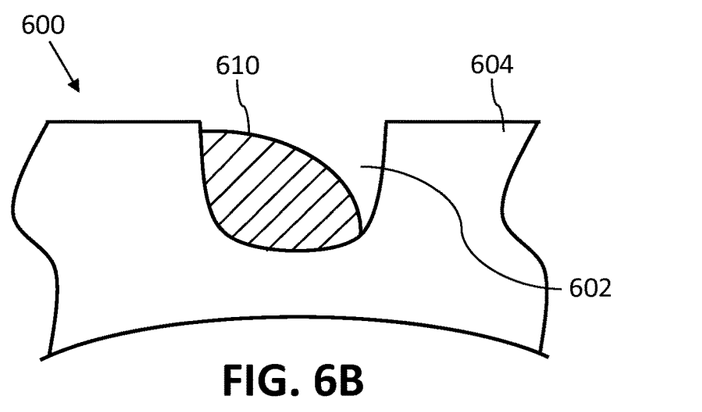
FIG. 6B illustrates a partial cross-sectional view of an example embodiment of a tire having a flexible gate apparatus in a closed position.

FIG. 6B illustrates a partial cross-sectional view of a tire comprising a tread 600. Flexible gate apparatus 610 may comprise a substantially curved radially outer edge and a radially inner edge integrated with a portion of a base of groove 602. The radially outer edge of flexible gate apparatus 610 may curve radially inwardly as it extends axially from a sidewall of at least one groove 602, and may additionally extend from a base of groove 602 as described above with reference to FIG. 6A.

Figure 6C:
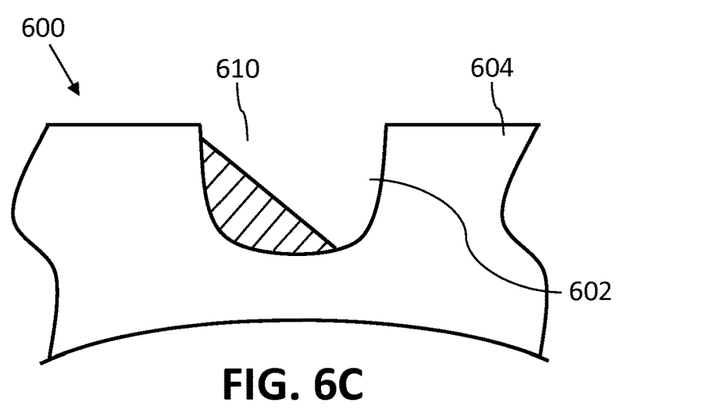
FIG. 6C illustrates a partial cross-sectional view of an example embodiment of a tire having a flexible gate apparatus in a closed position.

FIG. 6C illustrates a partial cross-sectional view of a tire comprising a tread 600. Flexible gate apparatus 610 may comprise a substantially linear and angled radially outer edge and a radially inner edge integrated with a portion of a base of groove 602. The radially outer edge of flexible gate apparatus 610 may angle radially inwardly as it extends axially from a sidewall of at least one groove 602, and may additionally extend from a base of groove 602 as described above with reference to FIG. 6A.

In one embodiment, flexible gate apparatuses 110 and 310 are configured such that an air pressure exerted by an air flow through tread 100, 300 is insufficient to substantially deflect flexible gate apparatuses 110 and 310. As such, flexible gate apparatuses 110 and 310 may disrupt an air flow through tread 100, 300 such that noise normally emitted by an air flow through a tread is mitigated, thus resulting in tread 100, 300 emitting less pattern noise than an untreated tread.

In one embodiment, flexible gate apparatuses 110 and 310 are configured such that a pressure exerted by a water flow, or flow of a similar liquid, through tread 100, 300 is sufficient to substantially deflect flexible gate apparatuses 110 and 310. The deflection of flexible gate apparatuses 110 and 310 may be such that a liquid like water may flow through tread without being substantially disrupted. As a result, tread 100, 300 may exhibit improved wet performance while mitigating pattern noise produced during dry performance.

In one embodiment, flexible gate apparatuses 110 and 310 are configured to evacuate water in a specific direction from tread 100, 300. For instance, flexible gate apparatuses 110 and 310 may be designed to direct more water toward an inboard side, or rear side, of a tire than an outboard side, thus at least somewhat mitigating spray contaminating the side of the vehicle and other vehicles traveling on a roadway.

In one embodiment, flexible gate apparatuses 110 and 310 are configured to increase snow/ice traction of tread 100, 300. In one embodiment, snow from a roadway may be trapped by flexible gate apparatuses 110 and 310, thus resulting in more snow to snow interface between tread 100, 300 and a snowy/icy roadway.

In one embodiment, flexible gate apparatuses 110 and 310 are configured to allow tread 100, 300 to comprise a more aggressive tread pattern without unacceptable levels of pattern noise. In another embodiment, flexible gate apparatuses 110 and 310 are configured to allow tread 100, 300 to be tuned to achieve a more balanced performance between wet and dry operation without exceeding acceptable pattern noise levels.

To the extent that the term "includes" or "including" is used in the specification or the claims, it is intended to be inclusive in a manner similar to the term "comprising" as that term is interpreted when employed as a transitional word in a claim. Furthermore, to the extent that the term "or" is employed (e.g., A or B) it is intended to mean "A or B or both." When the applicants intend to indicate "only A or B but not both" then the term "only A or B but not both" will be employed. Thus, use of the term "or" herein is the inclusive, and not the exclusive use. See Bryan A. Garner, A Dictionary of Modern Legal Usage 624 (2d. Ed. 1995). Also, to the extent that the terms "in" or "into" are used in the specification or the claims, it is intended to additionally mean "on" or "onto." To the extent that the term "substantially" is used in the specification or the claims, it is intended to take into consideration the degree of precision available or prudent in manufacturing. To the extent that the term "selectively" is used in the specification or the claims, it is intended to refer to a condition of a component wherein a user of the apparatus may activate or deactivate the feature or function of the component as is necessary or desired in use of the apparatus. To the extent that the term "operatively connected" is used in the specification or the claims, it is intended to mean that the identified components are connected in a way to perform a designated function. As used in the specification and the claims, the singular forms "a," "an," and "the" include the plural. Finally, where the term "about" is used in conjunction with a number, it is intended to include ±10% of the number. In other words, "about 10" may mean from 9 to 11.

As stated above, while the present application has been illustrated by the description of embodiments thereof, and while the embodiments have been described in considerable detail, it is not the intention of the applicants to restrict or in any way limit the scope of the appended claims to such detail. Additional advantages and modifications will readily appear to those skilled in the art, having the benefit of the present application. Therefore, the application, in its broader aspects, is not limited to the specific details, illustrative examples shown, or any apparatus referred to. Departures may be made from such details, examples, and apparatuses without departing from the spirit or scope of the general inventive concept.

The invention claimed is:

1. A tire having a tread, comprising:
 a groove comprising a groove base and at least one groove sidewall;
 a plurality of flexible gate apparatuses each comprising:
  at least four flexible gate elements that are evenly spaced relative to one another and that are arranged in a straight pattern, wherein the at least four flexible gate elements extend from the groove base;

wherein each the plurality of flexible gate apparatuses extends one of partially or completely and one of axially or angled across an axial width W of the groove;

wherein the plurality of flexible gate apparatuses of at least a length L of the tread have flexible gate elements that are identically arranged;

wherein the length L is measured in the circumferential direction and is equal to about 10 mm to about 100 mm;

wherein the plurality of flexible gate apparatuses each comprises a rigidity such that the plurality of flexible gate apparatuses do not deflect at the application of an air pressure during operation; and wherein the plurality of flexible gate apparatuses each comprises a rigidity such that the plurality of flexible gate apparatuses deflect at the application of a water pressure during operation.

2. The tire of claim 1, wherein the plurality of flexible gate apparatuses of at least a length L of the tread extends across at least 25% of the width.

3. The tire of claim 1, wherein the groove comprises at least one of a circumferential groove, a lateral groove, a notch, and a slot.

4. The tire of claim 1, further comprising at least one rib, wherein the groove extends across the at least one rib.

5. The tire of claim 4, wherein the at least one rib comprises a shoulder rib.

6. The tire of claim 1, wherein the at least four flexible gate elements of each of the plurality of flexible gate apparatuses extend orthogonally from the groove base.

7. The tire of claim 1, wherein the length L is equal to one of 10 mm, 20 mm, 30 mm, 50 mm, and 100 mm.

8. The tire of claim 1, wherein the at least four flexible gate elements of each of the plurality of flexible gate apparatuses has a radial height, and wherein each of the plurality of flexible gate apparatuses is spaced apart by a distance that is at least equal to the radial height of the at least four flexible gate elements.

9. The tire of claim 1, wherein the at least four flexible gate elements are oriented in a row extending axially across at least a portion of the groove.

10. The tire of claim 1, wherein the at least four flexible gate elements are oriented in a row extending angled across at least a portion of the groove.

11. The tire of claim 1, wherein each of the at least four flexible gate elements has a thickness between 0.5 mm and 5.0 mm.

12. The tire of claim 1, wherein each of the at least four flexible gate elements has a thickness between 0.8 mm and 2.0 mm.

13. The tire of claim 1, wherein each of the at least four flexible gate elements has a thickness between 1.0 mm and 1.5 mm.

* * * * *